United States Patent
Huang et al.

[11] Patent Number: 5,682,522
[45] Date of Patent: Oct. 28, 1997

[54] SHARED MEMORY ARCHITECTURE OF GRAPHICS FRAME BUFFER AND HARD DISK CACHE

[75] Inventors: Hung-Ju Huang, Taipei; Hung-Ming Lin, Hsin Chu Hsien, both of Taiwan

[73] Assignee: Silicon Integrated Systems Corp., Hsin-Chu, Taiwan

[21] Appl. No.: 503,704

[22] Filed: Jul. 18, 1995

[51] Int. Cl.$^6$ ................................................ G06F 15/167
[52] U.S. Cl. .................... 395/512; 395/501; 395/521; 395/480
[58] Field of Search ...................... 395/501, 502, 395/507–509, 512, 521, 474, 445, 453, 480; 345/185, 189, 201, 203

[56] References Cited

U.S. PATENT DOCUMENTS 5,388,207  2/1995  Chia et al. .............................. 395/515
5,450,542  9/1995  Lehman et al. ......................... 395/521

*Primary Examiner*—Kee M. Tung

[57] ABSTRACT

A shared memory architecture of graphics frame buffer and hard disk cache is presented. The architecture includes a system bus interface, a hard disk controller, a graphics controller, an arbiter, a memory and a shared memory block. The shared memory block is divided into graphics frame buffer memory and hard disk controller cache memory. The arbiter determines the shared memory access priority between the graphics controller and the hard disk controller. By mean of hardware implementation, memories can be shared by the graphics controller and the disk controller. The complexity of the system is reduced and the system performance is enhanced. The overall system cost is decreased.

6 Claims, 5 Drawing Sheets

| RESOLUTION/NO OF COLORS | 16 | 256 | 32768 | 65536 | 16M |
|---|---|---|---|---|---|
| 640*480 | 1 | 1 | 1 | 1 | 1 |
| 800*600 | 1 | 1 | 1 | 1 | 2 |
| 1024*768 | 1 | 1 | 2 | 2 | 4 |
| 1280*1024 | 1 | 2 | 4 | 4 | |

FIG.1

SHARED MEMORY ARCHITECTURE OF GRAPHICS FRAME BUFFER AND HARD DISK CACHE

FIELD OF THE INVENTION

This invention relates to a memory architecture of a computer system and more specifically to a memory architecture that shares the memory of a graphics frame buffer and the cache memory of a hard disk.

BACKGROUND OF THE INVENTION

In the past few years, the central processing unit (CPU) of a computer system has made significant progress. CPUs such as pentium chips can execute instruction with very high speed. However, the peripheral devices, i.e, hard disks, floppy disks, CD ROMs and printers, still have limited speed when accessed by the computer system. Although the hard disk is the fastest device among the peripheral devices, its accessing speed is very slow when compared to the CPU execution speed. In order words, when a computer program is executed, the CPU has to wait until the peripheral device access is completed before the next instruction can be executed. Therefore, during the process of executing a program, the performance of the computer system is degraded because too much time is spent on waiting. In the mean time, the efficiency of using the high speed CPU is very low.

In order to overcome the above-mentioned problem, cache memories are often used in a hard disk. Cache memories can be added to a disk controller card to increase the speed of accessing a hard disk. Nevertheless, the cost of a disk controller is increased. Consequently, the cost and complexity of a computer system are also increased.

In a personal computer system, a video graphics adapter including a frame buffer is usually available for displaying video information such as user interface and program output. The sizes of the memory in the frame butter of the video graphics adapter with respect to different video modes are shown in FIG. 1. The resolution and colors commonly seen in the market are shown in the figure. High quality and true color video display requires higher resolution, more colors, and more memories. For example, a 800×600 resolution and 32768 color video display requires 1M byte memory for the frame buffer. A 1280×1024 resolution and 32768 color display requires 4M bytes for the frame buffer.

Although a high-end computer often comes with 4M byte memories for video graphics frame buffer and 128K byte cache memories, the frame buffer memories may not be fully utilized while running a program. For some programs, only 1M byte memories are adequate for their video display modes. Under those circumstances, 3M bytes of the 4M byte frame buffer memories are idled and not in use. On the other hand, users frequently increase the cache memories of the hard disk to 256K bytes in order to speed up the access of hard disk memories. It can be understood that the computer system has not utilized its memory resources effectively. The idled memory in the graphics frame buffer should have been managed more efficiently.

SUMMARY OF THE INVENTION

This invention has been made to overcome the requirement of having more cache memories for slow peripheral devices and to increase the efficiency of using memories in the graphics frame buffer of a computer system. The invention presents a new memory architecture for the video memory of a graphics frame buffer and the cache memory of a hard disk controller. By integrating the graphics frame buffer and the hard disk cache memory together, the video memory and the cache memory can be shared between each other. A common memory block can be used for both the video memory and the cache memory. When a part of the common memory is used for the frame buffer, the remaining part can be used for the cache memory of the disk controller. Therefore, memory resources can be fully utilized.

The object of the invention is to take advantage of the idled memory in the frame buffer of the video graphics adapter. By using the idled memory as the cache memory for the disk controller, the size of the total memory in the computer system can be decreased and the overall cost can be reduced.

Another object of the present invention is to present an architecture for sharing the frame buffer memory and the disk controller cache memory in order to reduce the complexity of the computer system and to increase the speed and performance of the system.

The present invention presents an architecture that integrates the video graphics controller and the hard disk controller of a computer system together. A shared memory block is shared between the two controllers and controlled by a memory controller. An arbiter determines either the graphics controller or the hard disk controller has a higher priority in accessing the shared memory block and gives the privilege to the higher priority controller. The shared memory block is divided into two parts. One is used as the frame buffer for the video graphics controller and the other is used as the cache memory for the hard disk controller. The memory controller determines how to partition the shared memory block between the frame buffer and the cache memory.

The cache memory of the hard disk controller can be used as a memory buffer for storing additional read-ahead data when data are read from a hard disk. Therefore, if the desired data have been stored in the cache memory, reading hard disk data can be accomplished by reading data in cache memory. The cache memory can also be used as a memory buffer for storing data before they are written to a physical hard disk. Writing data to the hard disk can be accomplished by writing data to the cache memory without having to wait until the data has been written to the hard disk. Because the speed of accessing a hard disk is much slower than the speed of a CPU, the cache memory provides a very efficient way of reducing the unnecessary waiting time and greatly enhances the overall performance of a computer system.

BRIEF DESCRIPTION OF THE DRAWINGS

FIG. 1 shows the size of the required display memory with respect to different video display modes;

DETAILED DESCRIPTION OF THE PREFERRED EMBODIMENTS

Figure 2:
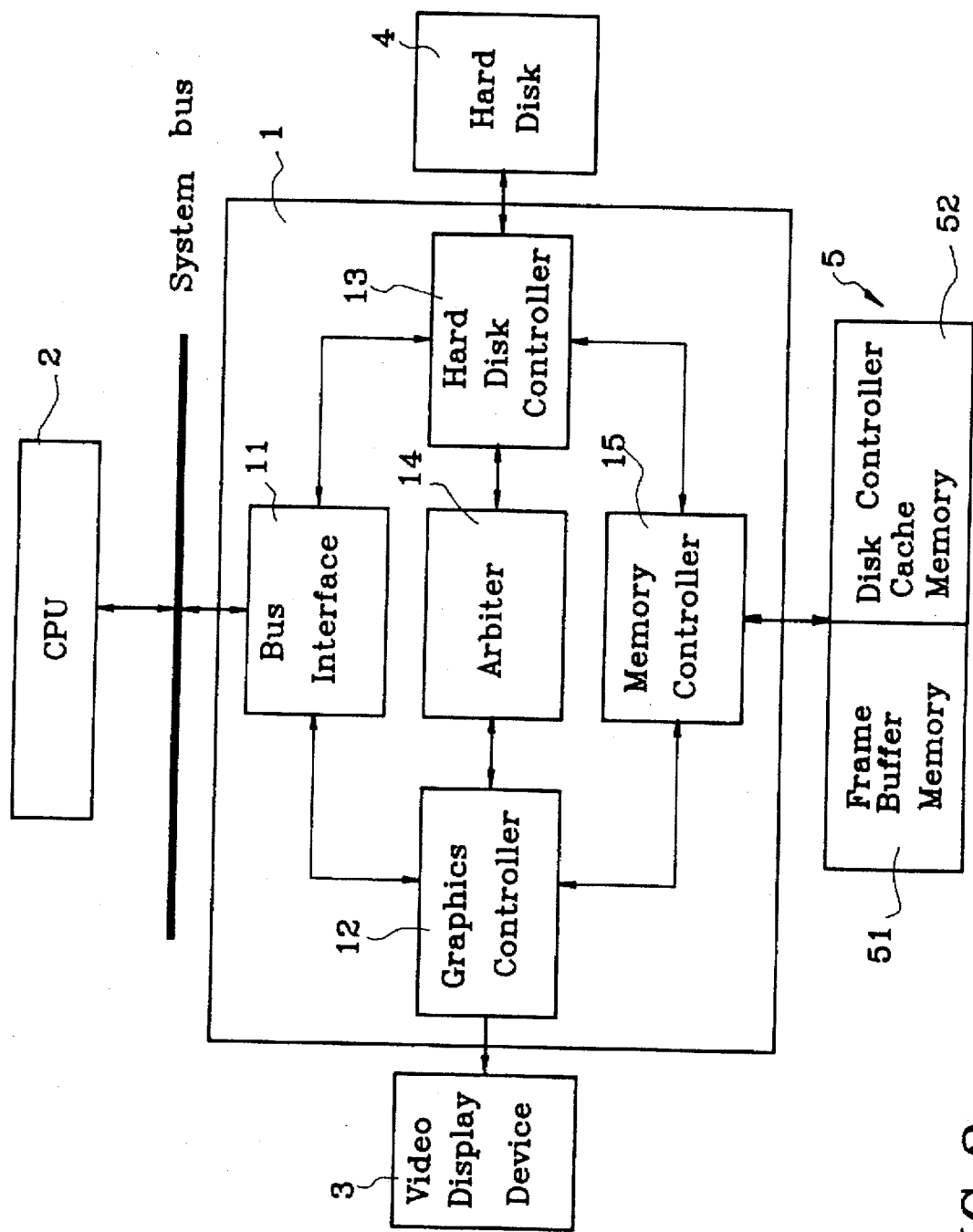
FIG. 2 shows the system block diagram of the preferred embodiment of this invention.

With reference to FIG. 2, the system block diagram of the preferred embodiment of the present invention includes a common controller 1 for the video graphics and the hard disk controller, a CPU 2, a video display device 3, a hard disk 4, and a shared memory 5. The common controller 1 comprises a bus interface 11, a graphics controller 12, a hard disk controller 13, an arbiter 14, and a dynamic random access memory (DRAM) controller 15. The bus interface 11 is connected to the CPU 2 through the system bus in order to receive or transmit data for the CUP 2. The graphics controller 12 controls the data flow between the video display device 3 and the CPU 2. The DRAM controller 15 controls the shared memory 5 for the hard disk controller 13 and the graphics controller 12.

The shared memory 5 is divided into two parts, i.e., the frame buffer memory 51 and the disk controller cache memory 52. In fact, a part of the shared memory 5 is reserved for the video graphics controller 12 as its frame buffer memory and the remaining memory becomes the disk controller cache memory. Therefore, under the present architecture, the shared memory 5 can be fully used and the total amount of the memory required in the system is reduced.

The arbiter 14 determines which controller has the privilege of using the shared memory 5 and what type of memory access is to be performed. The arbiter 14 accurately assigns the memory resource in order to achieve the optimal system performance. It also avoids the system mistakes caused by too much delay. Each memory access to the shared memory 5 is given a priority. The arbiter 14 controls the access of the shared memory 5 according to the priority so that memory access can be performed efficiently and orderly.

Figure 3:
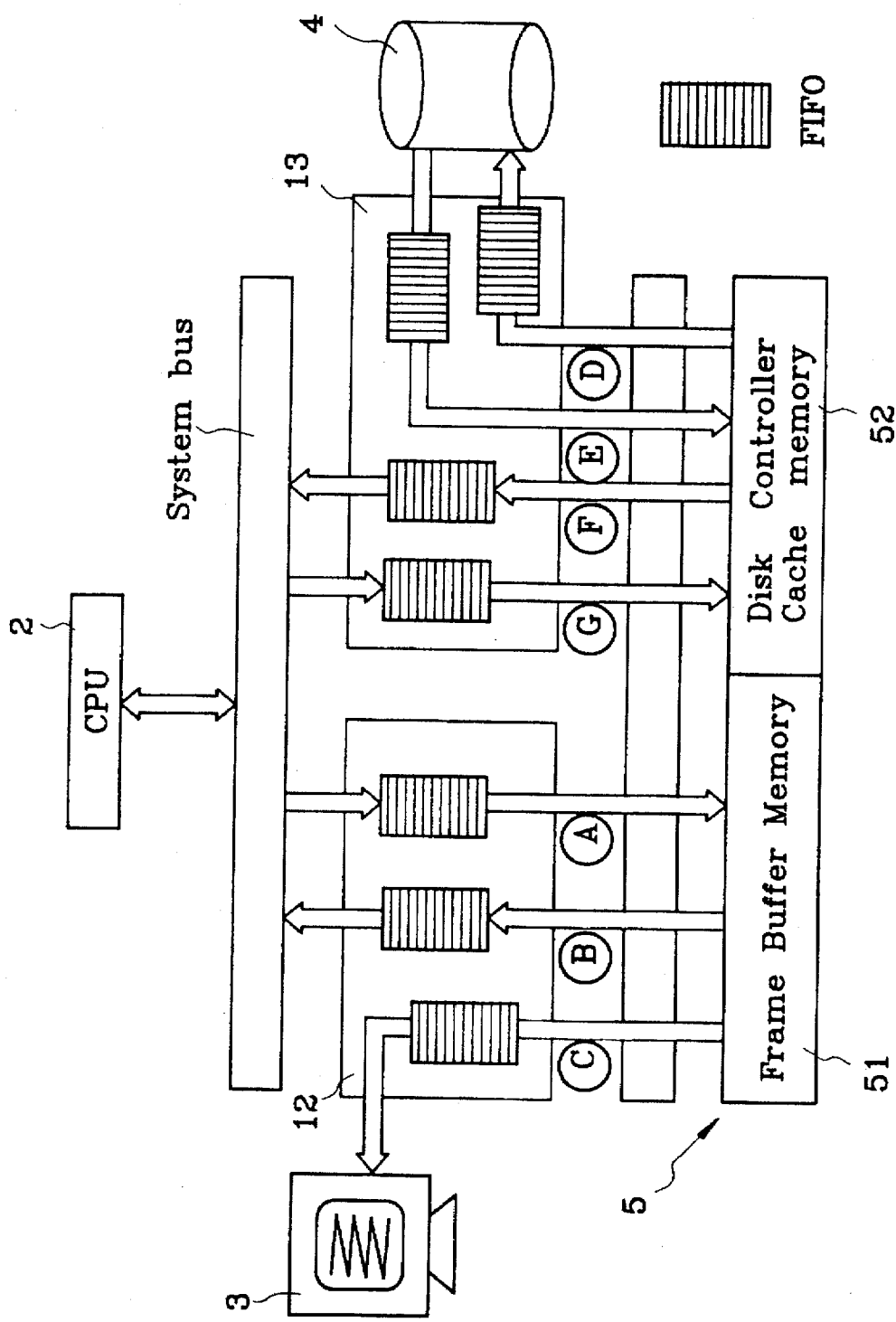
FIG. 3 shows the data paths of accessing the shared memory block of the present invention.
Figure 4:
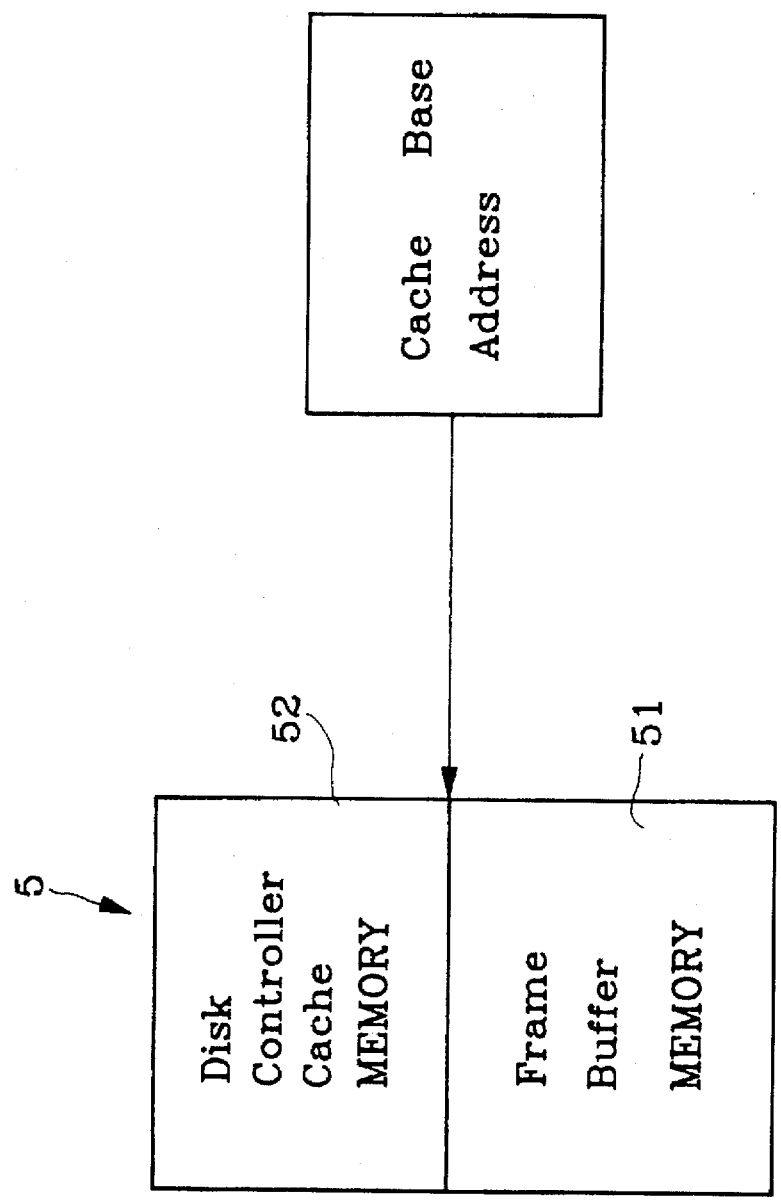
FIG. 4 shows the frame buffer memory of the video graphics controller and the cache memory of the hard disk controller in the shared memory block of the present invention.

FIG. 3 illustrates the data path of accessing the shared memory 5. First-in-first-out models are established in the data paths of both graphics controller and the hard disk controller in order to minimize the waiting time for each controller unit and increase the overall system performance. As shown in FIG. 3, the data paths controlled by the graphics controller include the access paths A, B of the CPU 2 to the frame buffer memory 51, and the data path C for CRT refresh cycle of the video display deice 3. The data paths controlled by the hard disk controller 13 include data transmission between the hard disk 4 and the disk controller cache memory 52 and the transmission between the CPU 2 and the disk controller cache memory 52. Paths D and E are for writing to and reading from the hard disk 4 by the cache memory 52. Paths F and G are for writing to and reading from the CPU 2 to the cache memory 52 respectively.

From the architecture shown in FIG. 2 and FIG. 3, it can be seen that the graphics controller 12 and the disk controller 13 may try to access the shared memory 5 at the same time. The arbiter 14 needs to determine the priority of accessing the memory. The controller having a higher priority is given the privilege of memory access. After the completion of the memory access, the privilege is returned to the arbiter 14 and then given to the controller which has the next priority of accessing the shared memory 5. Under the present architecture, there are two potential bottle necks in memory access. One is on the system bus. Taking PCI system bus as an example, its maximum bandwidth is 132M bytes per second. The maximum speed of the hard disk is 20M bytes per second. In general, it is much smaller than the maximum bandwidth of PCI bus. Therefore, the load to the PCI system bus is very minimal. The other bottle neck is on the DRAM bus. The bandwidth of 64 bit wide DRAM bus is 200M bytes per second. The hard disk may take 40M bytes per second for cache reading and writing. Hence, system performance may be degraded for certain high resolution video mode.

Figure 5:
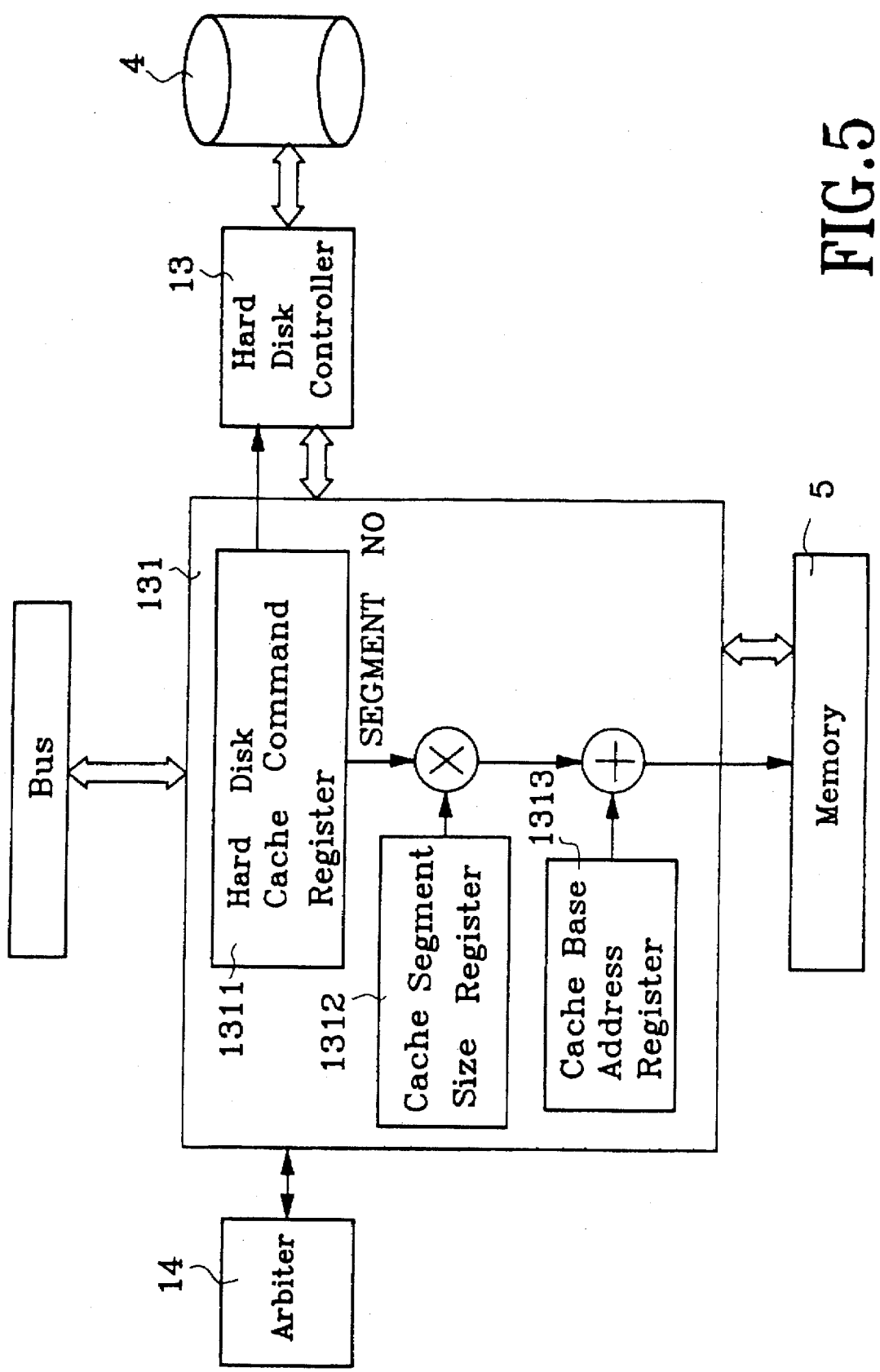
FIG. 5 shows the hard disk cache memory controller in the hard disk controller of FIG. 2.

As shown in FIG. 5, the hard disk controller 13 includes a hard disk cache controller 131. The hard disk cache controller 131 is responsible for writing data to or reading data from the cache memory. The speed of cache memory is compatible with the speed of CPU. When the CPU 2 needs to write data to the hard disk 4, it can write data to the disk controller cache memory 52. Although the CPU 2 has to wait until it is given the privilege of memory access by the arbiter 14, the waiting time is very short as compared to hard disk memory access time. Therefore, the CPU 2 can quickly finish writing data to the cache memory and continue its next operation. The hard disk controller 13 then writes the data in the cache memory to the hard disk 4. Similarly, when the CPU 2 needs to read data from the hard disk 4, the cache memory 52 can be used to speed up reading data from the hard disk 4.

The system memory of a computer system usually has an area designated as cache tag. The cache tag contains the location of the current cache memory content in the hard disk 4. Before CPU 2 reads data from the hard disk, it determines if the data are stored in the disk controller cache memory 52 by reading the cache tag. If the data are already in the cache memory 52, it can be read from the cache memory 52 without accessing the hard disk 4. Otherwise, the data have to be read from the hard disk to the controller cache memory before the CPU can read them. The delay in CPU speed under this circumstance is unavoidable. To minimize the delay, the size of the cache memory has to be increased.

The hard disk cache controller 131 includes a hard disk cache command register 1311, cache segment size register 1312, and a cache base address register 1313. The command register 1311 is a temporary storage area for read/write instructions, address of hard disk magnetic area, and segment number of the cache memory. The cache segment size register 1312 contains the size of each cache memory segment and the cache base address register 1313 contains the base address of the cache memory 52 in the shared memory 5. The hard disk cache controller 131 sends its data to the CPU 2 through system bus. It has a read/write control line and a data bus connected to the hard disk controller 13. The cache controller also has an address bus and a data bus to the shared memory 5.

When the CPU 2 tries to read from or write to the hard disk cache memory 52, the arbiter 4 gives the memory access privilege to the hard disk controller 13. The hard disk cache controller 131 issues a cache memory segment number according to the instruction sent from the CPU 2. The segment number times the value in the cache segment size register 1312 and adds the base address of the cache memory stored in the cache base address register 1313 to form the memory address of the accessed cache memory in the shared memory 5. The hard disk cache controller 131 accesses the cache memory 52 according to the computed address.

On traditional solutions, there are two different mechanisms in forming cache memory for a hard disk controller. One mechanism uses the system memory of the computer and the other uses additional memories added to the hard disk controller. The present invention takes advantage of the unused memory in the frame buffer of a video graphics adaptor to form the cache memory 52 for the hard disk controller. The hard disk controller cache memory 52 is divided into several segments. Some segments of the cache memory are used for reading from the hard disk and some segments are used for writing to the hard disk. The access of the hard disk controller cache memory usually requires executing a hard disk cache memory controller program. Because of the complexity in the program, a co-processor of CPU 2 is generally used to execute the program. In the present invention, the hard disk cache memory controller program is executed by the CPU 2. Therefore, the program is included in the hard disk driver.

When the hard disk cache memory controller program tries to fetch some data from the hard disk 4, the program fetches some additional data from the hard disk and stores them in the cache memory 52 based on some pre-determined formula. The process is commonly called "read-ahead" and its procedure can be described as follows:

STEP 1

A program issues a hard disk read command to the hard disk driver. The hard disk cache memory controller program in the driver computes the locations of the magnetic area in the hard disk for the desired data including read-ahead data, and the corresponding cache memory segment number in the disk controller cache memory 52. The computed information is sent to the cache command register 1311 of the hard disk cache controller 13.

STEP 2

The hard disk controller receives the instruction and fetches the data from the hard disk. It also obtains the privilege of accessing the shared memory 5 from the arbiter 14. The data fetched from the hard disk are stored in the disk controller cache memory 52.

STEP 3

The CPU 2 fetches data from the disk controller cache memory 52.

STEP 4

The information regarding the magnetic area of the read-ahead data is stored in the cache tag.

STEP 5

If the program issues another hard disk read instruction, the hard disk cache memory controller program checks the cache tag to determine if the desired data have been saved in the hard disk controller cache memory 52. If the data is in the cache memory, they are fetched from the cache memory. Otherwise, STEP 1 is executed.

The hard disk cache memory controller program also serves the function of buffering the data written to the hard disk. The CPU 2 does not have to wait until the data are written to the hard disk 4 before it can execute the next instruction. The performance of the CPU 2 is improved because it decreases the waiting time. The procedure can be described as follows:

STEP 1

The program issues a hard disk write instruction to the hard disk driver. The driver checks if the hard disk controller cache memory 52 has space available. If a space is available, the data are written to the disk controller cache memory 52. Otherwise, the program waits until the cache memory has space available.

STEP 2

The hard disk cache memory controller program issues commands to the hard disk cache memory controller 131 for writing some segments of data in the cache memory to the hard disk 4.

STEP 3

After the hard disk cache memory controller program has issued commends to the hard disk cache memory controller 131. The program returns a data write completion signal without waiting until the data have been written to the hard disk 4.

What is claimed is:

1. A shared memory architecture for sharing memories between a frame buffer and a hard disk controller cache of a computer system comprising:

a system bus interface being connected to a CPU through a system bus for sending data to and receiving data from said CPU;

a memory controller being connected to a shared memory block having a first part as the memory of said frame buffer and a second part as the memory of said hard disk controller cache, said memory controller determining how to partition said shared memory block between said frame buffer memory and said hard disk controller cache memory;

a video graphics controller connecting said system bus interface, said memory controller and a video display device;

a hard disk controller connecting said system bus interface, said memory controller and a hard disk said hard disk controller comprising a hard disk cache memory controller for controlling said hard disk controller cache memory including:

a hard disk cache command register containing a read/write instruction, a magnetic area location on said hard disk, and a cache memory segment number;

a cache segment size register having the size of said hard disk controller cache memory; and a cache base address having the base address of said hard disk controller cache memory in said shared memory block;

and an arbiter being connected to said video graphics controller and said hard disk controller;

wherein said arbiter determines either said video graphics controller can access said frame buffer memory or said hard disk controller can access said hard disk controller cache memory.

2. The shared memory architecture according to claim 1, wherein said video graphics controller controls a plurality of data paths including a data path for writing data from said CPU through said system bus interface to said frame buffer memory, a data path for reading data from said frame buffer memory through said system bus interface to said CPU, and a data path for fetching data from said frame buffer memory to a CRT of said video display device during refresh cycle, and said hard disk controller controls a plurality of data paths including a data path for writing data from said hard disk controller cache memory to said hard disk, a data path for reading data from said hard disk to said hard disk controller cache memory, a data path for writing data from said CPU through said system bus interface to said hard disk controller cache memory, and a data path for reading data from said hard disk controller cache memory through said system bus interface to said CPU.

3. The shared memory architecture according to claim 1, wherein said arbiter further determines a memory access priority for said video graphics controller or said hard disk controller, the controller having highest memory access priority is given the privilege of accessing said shared memory block, and said highest priority controller accesses said shared memory block and returns said privilege after completing said memory access.

4. The shared memory architecture according to claim 1, wherein said hard disk controller further comprises a hard disk controller driver having a hard disk cache memory controller program, said program having a formula for determining the order of accessing said hard disk controller cache memory and controlling the access of said hard disk controller cache memory, said program being executed by said CPU.

5. The shared memory architecture according to claim 1, wherein said hard disk controller further comprises a hard disk controller driver having a hard disk cache memory controller program, said program executing a read-ahead memory access method for reading data from said hard disk comprising the steps of:

a. issuing a hard disk read command and determining a magnetic area location on said hard disk and a cache memory segment number for said data along with a read-ahead part, said location and said segment number being sent to said hard disk cache command register;

b. reading said data from said hard disk, accessing said shared memory and saving said data along with said read-ahead part to said hard disk controller cache memory;

c. sending said data from said hard disk controller cache memory to said CPU;

d. storing said magnetic area location and said segment number in a cache memory tag of said computer system;

e. issuing another hard disk read command when it is necessary to read other new data from said hard disk, said cache memory tag being checked to determine if said new data are in said hard disk controller cache memory; and f. reading said new data from said hard disk controller cache memory to said CPU if said new data are in said cache memory and repeating step e, otherwise repeating step a.

6. The shared memory architecture according to claim 1, wherein said hard disk controller further comprises a hard disk controller driver having a hard disk cache memory controller program, said program executing a cache memory buffering method for writing data to said hard disk comprising the steps of:

g. issuing a hard disk write command and checking if said hard disk controller cache memory has space available;

h. writing said data to said cache memory if said cache memory has space available, otherwise waiting until said cache memory has space available;

i. issuing a command to said hard disk controller for writing said data in said cache memory to said hard disk; and j. returning a data write completion signal without waiting for the completion of writing said data in said cache memory to said hard disk.

* * * * *